April 6, 1965   H. BOSSELAAR   3,177,381
APPARATUS FOR ULTRASONIC WALL THICKNESS MEASUREMENTS
Filed March 11, 1963

INVENTOR:
HENDRIK BOSSELAAR
BY: H. D. Buick
HIS ATTORNEY 3,177,381
APPARATUS FOR ULTRASONIC WALL THICKNESS MEASUREMENTS
Hendrik Bosselaar, Amsterdam, Netherlands, assignor to Shell Oil Company, NewYork, N.Y., a corporation of Delaware
Filed Mar. 11, 1963, Ser. No. 264,153
Claims priority, application Netherlands, Mar. 22, 1962, 276,240
7 Claims. (Cl. 310—8.3)

The invention is related to a device for testing material with the aid of ultrasonic vibrations, in particular, for measuring the thickness of the material.

It is known that material can be tested by means of a procedure utilizing ultrasonic vibrations wherein to procure the transfer of energy with the least possible loss from the generator that supplies the ultrasonic vibrations to the specimen on the one hand and from the latter to the detector of the ultrasonic vibrations on the other, a coupling medium is used that wets the surfaces well. Another possibility to achieve this purpose is to use, besides coupling media, a piece of hard material, for instance metal, to bridge part of the distance from the generator to the specimen and from the specimen to the detector.

The application of such a piece of hard material has, however, the disadvantage that measurement is made difficult or impossible. This is due to the interference of echoes that are caused by vibrations being reflected by the walls of the bridging piece. This drawback is particularly apparent when using the ultrasonic pulse technique wherein the crystal that serves as the generator can also perform the duty of the detector so that the entire device is on one side of the material to be tested. This method is applied in particular for measuring wall thicknesses of parts of plants that are in operation. A description of an independently known pulse technique is to be found, for instance, in J. Krautkrämer, "Werkstoffprüfung mit Ultraschall," 1961, p. 153.

It has now been found that precise measurement without, or practically without, spurious echoes can be performed if a metal bridging piece is used of an entirely or mainly cylindrical shape and whose cylindrical wall is provided with one or more incisions having an acute root angle.

The incisions according to the invention are preferably circumferential and/or parallel to the axis of the bridging piece. It is an advantage to make the incisions in the surface contiguous. The incisions may thus be annular and parallel to each other and the angle between the planes through such rings and the plane of a perpendicular section of the cylindrical piece may vary from 0 to 90 degrees; the incisions may also be helical; and finally, the incisions may also give the bridging piece the apperance of a spiral milling cutter.

It is also an advantage to make the depth of the incisions so that the diameter of the bridging piece at the root of the incision is at least equal to the diameter of the crystal of the generator and of the detector. It is furthermore an advantage if the root angle of the incisions is 135 degrees or less.

Finally, it is desirable that the end of the cylinder nearest the material to be tested should be a cone truncated parallel to its base, its axis coinciding with that of the cylinder and its upper plane having at most the same diameter as the crystal of the generator and/or the detector. The apex angle of the truncated cone is preferably 100 to 175 degrees.

As a result of these measures, ultrasonic vibrations in the bridging piece which do not travel in a purely axial direction strike boundary planes of the bridging piece and because of the specific angular relationship of these planes to the axis of the bridging piece, are reflected in such directions that they do not reach the detector or only reach the detector after having bounded from several planes, as a result of which they are considerably weakened. These weakened vibrations reaching the detector interfere very little, if at all, with the actual measurements.

It is an advantage to make the bridging piece of a material that has a low acoustical impedance. It has been found that magnesium/aluminum alloys of various compositions are suitable for the manufacture of and use as the bridging piece.

The advantages of using a metal bridging piece constructed as described above appear, inter alia, when measurements have to be carried out to determine, for instance, the thickness of material at very high temperatures. A situation of this kind frequently occurs in plants while in operation, such as distilling towers and catalytic cracking plants, where wall temperatures of up to 500° C. are liable to occur. The crystal of the generator/detector must generally not exceed about 80° C., as otherwise the crystal may be damaged or the action of the generator/detector may be impaired. To prevent the temperature of the crystal from exceeding its critical value, i.e., about 80° C., cooling of the crystal is sometimes effected by means of a flowing coupling medium, for instance, water. A drawback of this method is that the material is strongly cooled exactly at the site where the measurement is carried out. This may have an adverse effect upon the elastic properties of the material. It is therefore important to avoid such cooling of the material. Since the crystal of the generator/detector should always be protected from overheating, however, this protection can also be achieved by making the distance between the generator/detector and the hot material to be tested sufficiently large with the aid of a bridging piece of sufficient length, for instance, at least 5 cm., so that during the time needed for the measurement the temperature of the generator/detector remains below the critical temperature, of, for instance, 80° C. If the bridging piece is designed according to the invention, there will be no spurious echoes in spite of the length of the piece required, so that measuring with high accuracy remains possible without changes in the temperature of the measuring spot. An additional advantage is the absence of the equipment required for passing the cooling liquid over the measuring spot, thus making the device according to the invention much simpler to handle.

Of course, in measuring materials at high temperature a suitable coupling medium between such material and the bridging piece must be used. For this purpose a flux, as applied in hard soldering, can be used. At lower temperature several liquids are eligible, such as water, silicone, oils, mineral oils, and the like.

Another example, in which a bridging piece according to the invention can be used advantageously concerns the measurement of small wall thicknesses or the measurement of flaws just under the surface of a material, for which it is necessary to introduce a time lag between the moment of emitting the pulse and the moment of receiving it. This time lag is determined by the length of the bridging piece and the material of which it is made.

A third example in which a connecting piece, according to the invention, greatly facilitates, or makes possible, the testing of materials, is measurement in locations far below the surface or otherwise of difficult accessibility. All that is then required is that the length and diameter of the bridging piece are appropriately adapted.

A form of the device according to the invention is further elucidated with reference to the accompanying drawing:

FIG. 1 of the drawing is an elevation, partly in section, showing the device.

Figure 1:
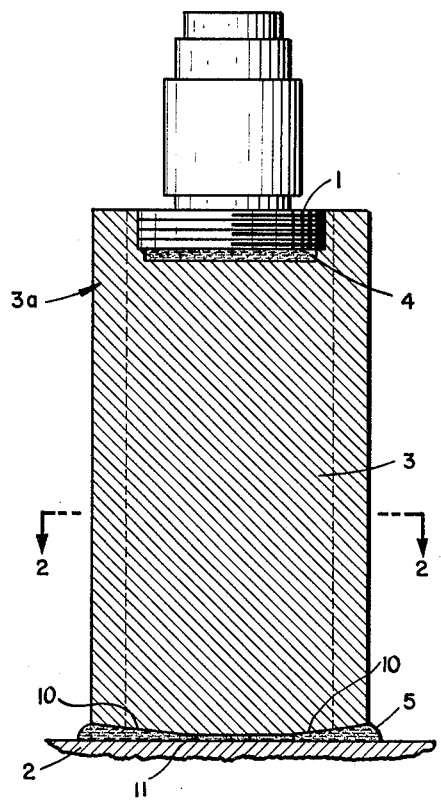
Figure 3:
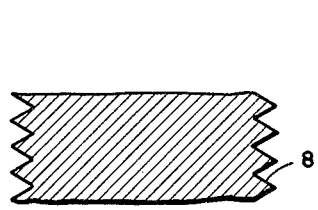
FIG. 3 is an elevation of part of the bridging piece showing an alternate form of the wall.
Figure 2:
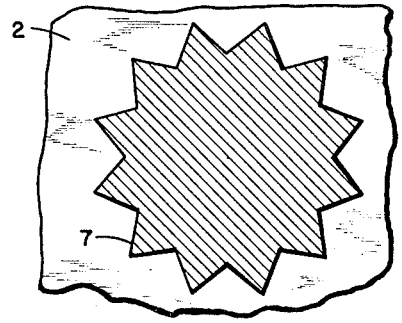
FIG. 2 is a sectional view taken along the line 2—2 of FIG. 1.

In FIG. 1, number 1 indicates a generator/detector for ultrasonic vibrations which consists mainly of a crystal that is caused to vibrate at intervals for a short time by a high-frequency pulse generator, not illustrated. During the time that the generator/detector 1 is not in operation as a generator, it serves as the detector for the vibrations reflected by a specimen 2, which vibrations can be recorded by a means well-known and not further illustrated. A cylindrical bridging piece 3 having a wall 3a provides, via coupling media 4 and 5, the acoustic coupling between the specimen 2 and the generator/detector 1 and also the necessary distance between the specimen 2 (which may be at an elevated temperature) and the heat-sensitive generator/detector 1. As shown in FIG. 2, separate incisions 7 are made longitudinally in the bridging piece 3. In FIG. 3, the incisions 8 made in the wall of the bridging piece are helical.

Preferably the end of the cylinder 3 nearest the material to be tested 2 is in the form of a cone truncated parallel to its base with the axis of the cone coinciding with that of the cylinder 3. As shown in FIGURE 1, the truncated cone is formed by providing the end of the cylindrical bridging piece 3 adjacent the piece 2 with a tapered surface 10 which is symmetrical about the axis of the bridging piece 3 and which extends from the outer surface of the bridging piece 3 to a flat surface 11 which is perpendicular to the axis of the bridging piece 3. Preferably the diameter of the upper plane of the cone, i.e., the surface 11, has at most the same diameter as the crystal of the generator/detector 1 and the apex angle of the truncated cone, i.e., the angle included between the tapered surfaces 10, is preferably from 100 to 175 degrees. With the subject configuration, any vibrations which are not traveling in a purely axial direction along the bridging piece 3, that is, any vibrations which do not pass through the area of the surface 11, are reflected by the angular surfaces 10 away from the generator/detector 1, and thus further tend to eliminate spurious signals caused by the non-axial traveling vibration waves from the output signal of the generator/detector 1.

I claim as my invention:

1. A device for testing material with the aid of ultrasonic vibrations, in particular, for measuring the thickness of the material by means of a generator/detector comprising: a metal bridging piece extending between said generator/detector and said material to be tested for transmitting vibrations therebetween; said bridging piece being cylindrical in shape with the cylindrical wall of the bridging piece being provided with one or more incisions having an acute root angle, the diameter of said bridging piece at the root of said incisions being at least equal to the diameter of the crystal of said generator/detector; said cylindrical bridging piece having its end nearest to said material to be tested formed by a cone which is truncated parallel to its base, the axis of said cone coinciding with the axis of said bridging piece and the upper plane of said cone having at most the same diameter as the crystal of said generator/detector.

2. A device as claimed in claim 1, characterized in that the length of the bridging piece is at least 5 cm.

3. A device as claimed in claim 1, characterized in that the incisions are circumferential to the axis of the bridging piece.

4. A device as claimed in claim 1, characterized in that the incisions are parallel to the axis of the bridging piece.

5. A device as claimed in claim 1, characterized in that the root angle of the incisions is equal to or less than 135 degrees.

6. A device as claimed in claim 1, characterized in that the apex angle of the truncated cone is from 100 to 175 degrees.

7. A device as claimed in claim 1, characterized in that the metal bridging piece is made of a magnesium/aluminum alloy.

References Cited by the Examiner
UNITED STATES PATENTS

| | | | |
|---|---|---|---|
| 2,467,301 | 4/49 | Firestone | 73—67.9 |
| 2,565,725 | 8/51 | Frederick et al. | 73—67.9 |
| 2,657,319 | 10/53 | Smack | 310—8.3 |
| 2,697,963 | 12/54 | Farrow | 73—67.9 |

MILTON O. HIRSHFIELD, *Primary Examiner.*